Nov. 18, 1924.

A. D. CANNER

LATHE TOOL

Filed May 6, 1922

Inventor

Albert D. Canner

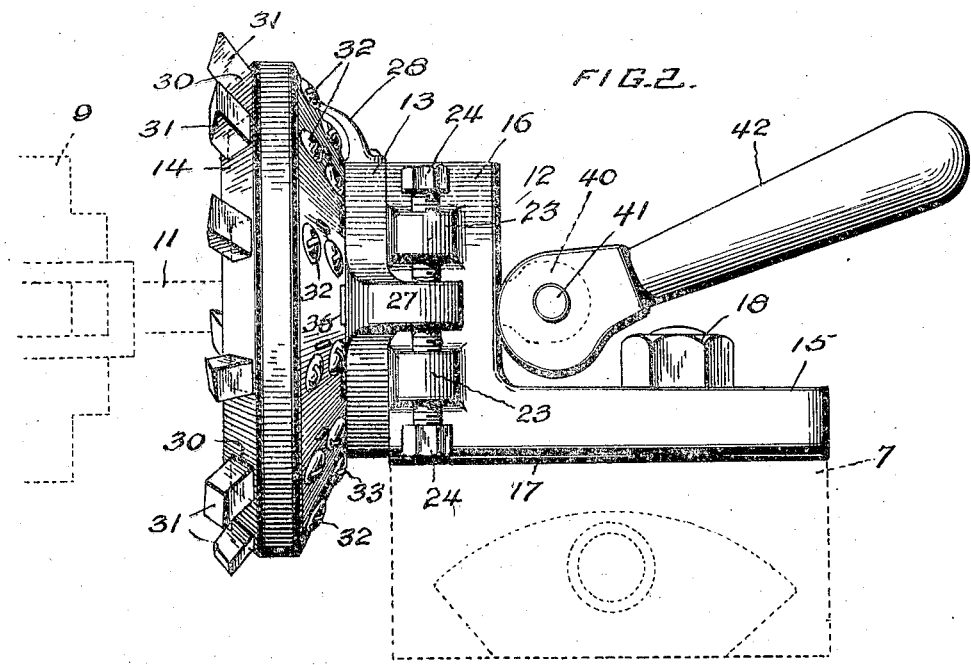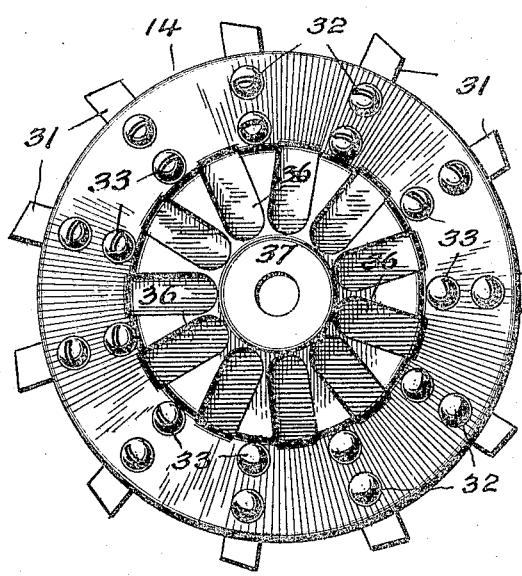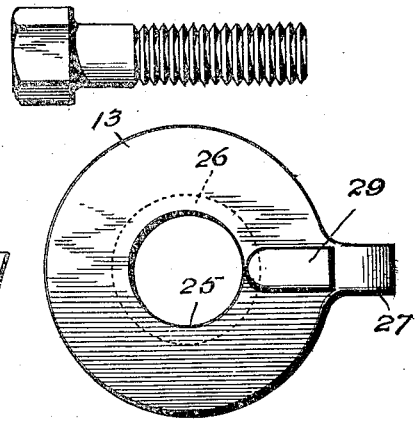

Patented Nov. 18, 1924.

1,515,591

UNITED STATES PATENT OFFICE.

ALBERT D. CANNER, OF CAMP HOLABIRD, MARYLAND.

LATHE TOOL.

Application filed May 6, 1922. Serial No. 559,026.

(FILED UNDER THE ACT OF MARCH 3, 1883, 22 STAT. L., 625.)

*To all whom it may concern:*

Be it known that I, ALBERT D. CANNER, a citizen of the United States, stationed at Camp Holabird, Maryland, have invented an Improvement in Lathe Tools, of which the following is a specification.

The invention described herein may be used by the Government, or any of its officers or employees in prosecution of work for the Government, or by any other person in the United States, without payment of any royalty thereon.

This invention relates to metal working tools, and more particularly to an improved tool holder for lathes, and consists of means whereby a series of tools may be progressively presented for operation on the work in an expeditious manner, said tools having been previously set in a head with their cutting points arranged progressively, both as to their relative use, set and position, said points being presented to the work for turning or threading same, and are preferably of a sufficient number and character as to perform a cycle of lathe operations that will complete that specific part of the work without re-setting a tool or readjusting the work.

One of the objects is to provide a simple, durable and inexpensive device of the class described wherein metal can be removed from one side of the thread angle only, the tool points increasing in length on an angle of 30 degrees from a line at right angles to the axis of the work. Further, to provide the maximum number of cutting points in the minimum space, said cutting points being rigidly mounted and quickly and accurately adjusted in the head, the latter of such a construction as to permit the easy setting of the several cutting tools in their respective positions.

A further object is to provide a device whereby duplicate articles may be produced accurately and at a high production rate, said device having a wide range of operations, and is so constructed as to occupy a comparatively small space.

A further object is to provide a tool holder so arranged as to facilitate the operations of the points close to the chuck jaws of the lathe and yet provide a rigid support for said points.

With these and other objects in view, the invention resides in the novel arrangement and combination of parts and in the detail construction hereinafter shown and described, it being understood that slight changes of form and minor details of construction may be resorted to without departing from the spirit of the invention or fall beyond the scope of the claims.

Similar numerals indicate corresponding parts in all the figures of the drawings in which:

Fig. 2 is a side view of same.

Fig. 4 is a detailed face view of the tool head.

Fig. 5 is a detailed face view of the locating disc.

Fig. 6 is a side view of an ordinary form of cap screwing.

Figure 1:
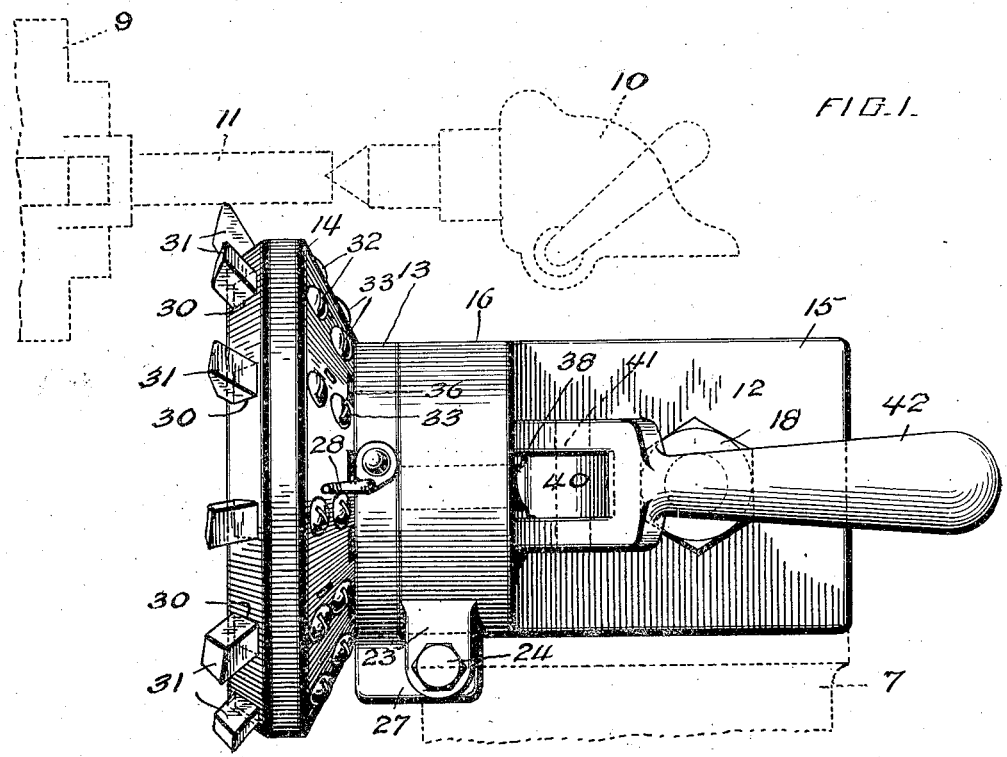
Fig. 1 is a plan view of my improved lathe attachment.
Figure 3:
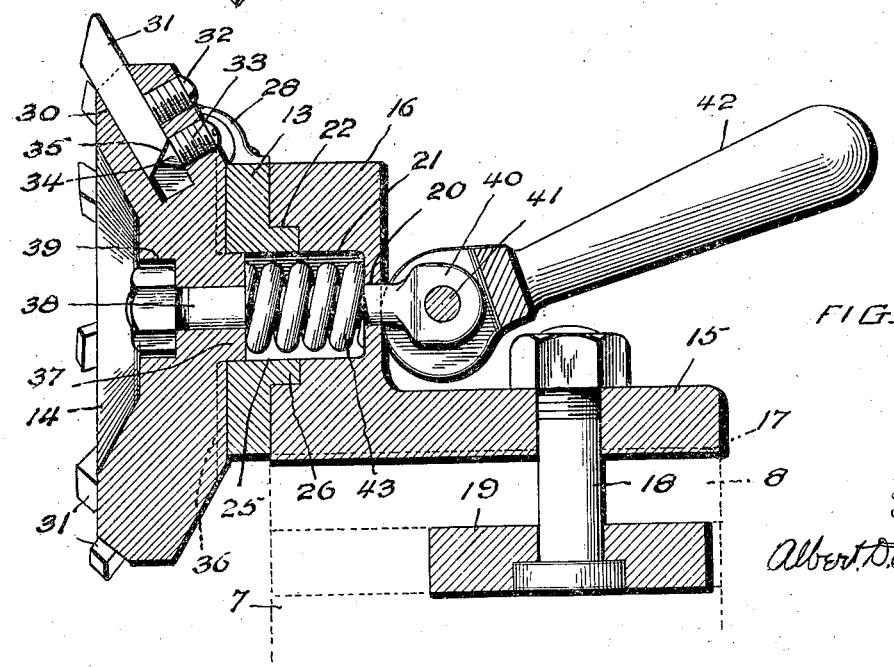
Fig. 3 is a vertical, longitudinal section of same.

The lathe attachment here shown is not intended to perform the duties of an automatic screw machine, but is designed to function in an intermediate capacity as between, for instance, an automatic machine which is extremely high priced, very complicated, and is limited to operate only a variation in size and slight changes in form of one article, and the ordinary form of single tool operation requiring the change of a cutting tool between each cut.

As an illustration, should it be necessary to produce a quantity of cap screws as shown in Fig. 6, of the attached drawings, and eleven cuts are required to complete said article, eleven tools are set consecutively in the tool head, and the tool head support is locked on the compound rest of a lathe, then by presenting one tool after another to the work, any number of articles may be produced that are accurate duplicates, and can be cut from the stock in only a fraction of the time that would be necessary with a single tool holder.

A feature of importance in the present invention is the manner of mounting the tool bits which allow not only a cut at right angle to the axis of rotation of the work, as is necessary in cutting square threads, but also permits the use of the cutting bits immediately adjacent to the chuck, and at the same time supporting the bits close to their cutting points, which is essential.

Reference now being had to the drawings by numerals, it will be seen that fragments of an ordinary form of lathe are shown, 7 indicating the compound rest having the T slot 8. The chuck is shown at 9, part of the tail piece at 10, and the work 11 is held by the chuck jaws and tail piece, all of the above forming no part of this invention.

The improved lathe attachment is provided with a support 12 and locating disc 13, the latter mounted for slight rotary movement on the support, a tool head 14 mounted to rotate independently of the disc or be clamped thereto and move with the disc when same is adjusted, means for clamping the attachment to the lathe and means for clamping the tool head to the support when the cutting operation is performed.

Support 12 is in the form of a bracket having a base 15 and the vertical portion 16. The base is provided on its under face with a gib 17, a T bolt 18, and a traveler plate 19, at the lower end of the bolt, all for engagement with the T slot of the compound rest, to which the support is securely clamped in a well known manner. The vertical portion 16 of the support is centrally bored at 20, through which the head clamping bolt extends and also an enlarged concentric seat 21 adapted to receive one end of a spring that will later be described.

Concentric with said spring seat 21 is a bearing seat 22, adapted to receive a sleeve of the locating disc 13. At one side, lugs 23—23 project from the support 16, through which set screws 24—24 are threaded.

The locating disc 13 is centrally bored at 25 and is provided with a bearing sleeve 26 projecting therefrom and adapted to rest in the bearing 22 of the support. An ear 27 projects from the edge of disc 13 and is so fashioned as to extend between the lugs 23—23 whereby the disc may be adjusted in a rotary manner by set screws 24—24. A finder spring arm 28 is mounted on the periphery of the disc and at its outer end is adapted to rest in a depression in the tool head when same is rotated to a cutting position. A lug 29 is provided on the face of the disc which is adapted to be seated in one of a series of seats in the adjoining face of the tool head, thus locking the tool head to the disc when desired.

The tool head is somewhat dish shaped and is of such a form as to provide a series of cutting tool cavities 30, in which the tools 31 are set at an angle of approximately 30 degrees from a right angle to the axis of rotation of the work, which permits the use of a tool adapted to cut at right angles to said rotation.

Intersecting each of the tool cavities 30 are tool clamping screws 32 and tool adjusting and supporting screws 33, the latter being tapered at their inner ends at 34 and adapted to come into contact with the inner bevel ends 35 of the tools for the fine adjustment of same. On the inner face of the tool head are a series of seats 36, so located in relation to the tools that when one of said seats is occupied by the lug 29 of the locating disc, one of the tools is within a very slight adjustment of a perfect working position, said fine adjustment being accomplished by the movement of the locating disc through set screws 24—24. A bearing sleeve 37 projects from the inner face of the tool head and is adapted to operate in the bore 25 of the disc 13.

A preferred means for securing the tool head in place when cutting, as well as for releasing the head to permit its rotation to bring another tool into its operating position consists of a head clamping bolt 38 passing through the tool head, on the outer end of which is threaded a nut seated in a depression 39 in the tool head. The clamping bolt extends through the head, the disc and the support, and is provided with a head 40 through which pin 41 passes and supports the eccentric lever 42. The head of the lever 42 is bifurcated and rests against the face of the support on either side of the head 40 of the bolt, and when lever 42 is operated it clamps the tool head in place.

A compression spring 43 encircles the bolt 38 and occupies the chamber formed in the support and the disc with one end against the end wall of the bore 21 and its other end against the end face of the sleeve 37 of the tool head and tends to force the tool head out of contact with the disc.

The operation of this attachment will be understood when Figure 6 of the drawings is referred to, which may be used as an example of an article that can be expeditiously produced by this attachment.

A number of cap screws of the type shown are to be cut; they must be in every way identical, quickly turned out, no automatic machine is available, and the amount of work does not warrant the purchase of such an expensive machine. With applicant's attachment and the ordinary form of lathe, the stock is cut into proper lengths. In converting said stock into cap screws there are 11 cuts to be made. 11 tools are consecutively set in the tool head which are so formed as to make the several cuts as required. The holder is then set to bring the first tool into its proper working position. The adjustment of the cutting tool above or below the center of rotation is effected by a slight rotation of disc 13 by said screw 24—24. The depth of cut or longitudinal adjustment of the cutting tools is effected by adjusting clamp screw 32 and bevel screw 33. After the first cut is made, eccentric lever 42 is lifted on its pivot, thus permitting spring 43 to force head 14 away from disc 13 a sufficient distance to withdraw lug 29 of the disc from the seat 36 in the tool head, at which time said head may be rotated on its bearing 37 within the disc, said bearing being of greater width than the axial movement of the head. When the head has been rotated to a position in which the next tool is in position, the finder spring arm 28 snaps into the next notch and the head will be in position to permit the operation of the eccentric lever and the head to be moved into its locked position with the disc. The above is repeated until the several tools operate consecutively on the stock and the article is finished, as far as that series of lathe operations are concerned.

It will be understood that while the above description and attached drawings refer to a tool head having 11 tools, and the work requires the use of all of the tools to complete the article, the head may have a capacity of, for instance, 20 tools and any portion of same used that are required on the work in hand.

It is further noted that this attachment may be used on any form of lathe and can be set or removed as quickly as a single tool, since, if the tools in the head are set relative to each other when the first tool is set, the others are also in position when the head is rotated to bring said other tools to the working position. Furthermore, a head may be set with tools for performing a certain cycle of operations and when not in use either the entire attachment or the head alone may be set to one side. In this manner, a series of cycles of lathe operations may be consecutively performed and the heads removed from the support and kept for future use without disturbing the tools.

It will be understood that under certain conditions, controlled by the location of the work in its relation to the cutting tool, as well as the relation between the tool and its mounting, a very fine adjustment of the head 14 is required, said adjustment being distinct from the general adjustment of the head in the locating disc to bring one or another of its seats 36 into engagement with lug 29. Said fine adjustment is accomplished by backing off one of the set screws 24 and advancing the other which moves lug 27 vertically, and the disc 13, head 14, and tool 31, in a rotary direction.

Having thus fully described this invention what is claimed and desired to be secured by Letters Patent is:

1. A tool holder for lathes, comprising a support, a locating disc rotatably mounted in the support, an adjustable tool head mounted for rotation with the disc, a plurality of cutting tools mounted in the head, and means for locking the head.

2. A tool holder for lathes, comprising a support, a locating disc rotatably mounted in the support, a tool head rotatably and longitudinally adjustable on its axis in the locating disc, and means for locking the head.

3. A tool holder for lathes, comprising a support, a locating disc rotatably mounted in the support, a tool head rotatably adjustable in relation to and in the disc, and means for locking the head.

4. A tool holder for lathes, comprising a support, a locating disc, rotatably mounted in the support, a tool head rotatably mounted in the disc, means for rotating the disc and the head, and means for locking the head to the disc.

5. A tool holder for lathes, comprising a support, a locating disc rotatably mounted in the support, a tool head rotatably mounted in the disc, means for rotatably adjusting the head by the disc, and means for locking the head to the disc.

6. A tool holder for lathes, comprising a support, a rotary tool head, a locating disc, rotatably mounted in the support, a plurality of cutting tools mounted in the head, means for independent adjustment of the head on its axis, means for securing the head to the disc, and separate means for adjusting the head by the disc.

7. A tool holder for lathes, comprising a support and locating disc rotatably mounted in the support, a rotatable tool head mounted in the disc, means for locking the tool head to the disc in a plurality of positions, and means for adjusting the locating disc after the head has been locked to the disc.

8. A tool holder for lathes, comprising a support, a locating disc rotatably mounted in the support, and a lug on the disc, an adjustable tool head having radially arranged seats, anyone of which being adapted to receive said lug on the disc, for locking the tool head to the disc, a plurality of cutting tools mounted in the head, and means for locking the head in engagement with the lug.

9. A tool holder for lathes, comprising a support, a locating disc rotatably mounted in the support, an adjustable tool head, a plurality of cutting tools mounted in the head, means for locking the disc against rotary movemtnt in the support, and means for locking the head to the disc, 10. A tool holder for lathes, comprising a support, an adjustable disc mounted in the support, an adjustable tool head mounted on the disc, a plurality of cutting tools mounted in the head, a clamping bolt mounted in the head and extending through the support, an eccentric lever mounted on the end of the bolt to draw the head into contact with the disc.

11. A tool holder for lathes, comprising a support, an adjustable locating disc, an adjustable tool head mounted on the disc, a plurality of cutting tools mounted in the head, a clamping bolt mounted on the head and extending through the support, an eccentric lever mounted on the end of the bolt to draw the head into contact with the disc, and lock same thereto, and a spring to force the head away from the disc when released.

12. A tool holder for lathes, comprising a support, an adjustable locating disc, an adjustable tool head mounted on the disc, a plurality of cutting tools mounted in the head, set screws mounted on the support, an ear extending from said disc and operated on by said set screws to adjust the disc.

13. A tool holder for lathes, comprising a rotatable, adjustable locating disc mounted in the support, a rotatable and longitudinally movable tool head mounted on the disc, said disc being provided with a lug, and said head being provided with a plurality of seats for said lug, a plurality of cutting tools mounted in the head corresponding in number to said seats, means provided for rotatably adjusting the head independently of the disc, means for drawing one of the seats into engagement with the lug to lock the head to the disc, and means for rotating the head and disc simultaneously relative to the support.

14. A tool holder for lathes, comprising a support, a locating disc rotatably mounted in the support, a tool head rotatably and longitudinally adjustable in the disc on a horizontal axis, a plurality of cutting tools adjustably mounted in the head at an angle of less than 90 degrees from its axis, having their cut points beyond the face of the head, a clamping bolt mounted in the head and extending through the support, an eccentric mounted on the end of the bolt and in contact with the support to draw the head into contact with the disc, a spring to force the head away from the disc, lugs on the support provided with set screws operating on an ear extending from said disc to rotatably adjust the disc and the head.

ALBERT D. CANNER.